US006982304B2

(12) United States Patent
Mure et al.

(10) Patent No.: US 6,982,304 B2
(45) Date of Patent: Jan. 3, 2006

(54) BLOW MOLDING RESINS WITH IMPROVED ESCR

(75) Inventors: Cliff Robert Mure, Hillsborough, NJ (US); Guylaine St. Jean, Somerset, NJ (US); Stephen Paul Jaker, Colonia, NJ (US); Robert J. Jorgensen, Scott Depot, WV (US); Karen Breetz, Morgantown, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 127 days.

(21) Appl. No.: 10/743,500

(22) Filed: Dec. 22, 2003

(65) Prior Publication Data

US 2005/0137365 A1   Jun. 23, 2005

(51) Int. Cl.
C08F 4/69 (2006.01)
C08F 4/78 (2006.01)
C08F 210/16 (2006.01)

(52) U.S. Cl. ...................... 526/106; 526/118; 526/119; 526/126; 526/129; 526/348

(58) Field of Classification Search ................ 526/106, 526/118, 119, 348
See application file for complete search history.

(56) References Cited

U.S. PATENT DOCUMENTS

| | | | |
|---|---|---|---|
| 2,825,721 A | 3/1958 | Hogan et al. ............. 260/88.1 |
| 3,023,203 A | 2/1962 | Dye ........................... 260/94.9 |
| 3,324,095 A | 6/1967 | Carrick et al. ............. 260/88.2 |
| 3,324,101 A | 6/1967 | Baker et al. ............... 260/94.9 |
| 3,622,251 A | 11/1971 | Allen ......................... 417/471 |
| 3,687,920 A | 8/1972 | Johnson .................... 260/88.2 |
| 3,704,287 A | 11/1972 | Johnson .................... 260/94.9 |
| 3,709,853 A | 1/1973 | Karapinka ................ 260/88.2 |
| 3,798,202 A | 3/1974 | Nasser, Jr. ................. 260/88.2 |
| 3,959,178 A | 5/1976 | Hogan ........................ 252/430 |
| 4,011,382 A | 3/1977 | Levine et al. ................. 526/96 |
| 4,025,707 A | 5/1977 | Hogan ....................... 526/105 |
| 4,100,105 A | 7/1978 | Levine et al. ............... 252/429 |
| 4,115,639 A | 9/1978 | Brown et al. .............. 526/130 |
| 4,325,839 A | 4/1982 | McDaniel .................. 252/430 |
| 4,369,295 A | 1/1983 | McDaniel .................... 526/96 |
| 4,528,790 A | 7/1985 | Lo et al. ....................... 52/407 |
| 4,994,534 A | 2/1991 | Rhee et al. ................... 526/88 |
| 5,034,364 A * | 7/1991 | Kral et al. ................. 502/117 |
| 5,169,816 A | 12/1992 | Dawkins .................... 502/152 |
| 5,198,400 A | 3/1993 | Katzen et al. ............. 502/113 |
| 5,310,834 A | 5/1994 | Katzen et al. ............. 526/114 |
| 5,408,015 A | 4/1995 | Hsieh et al. ................. 526/97 |
| 5,459,203 A | 10/1995 | Geerts et al. ............... 525/324 |
| 5,462,999 A | 10/1995 | Griffin et al. ................ 526/68 |
| 5,527,752 A | 6/1996 | Reichle et al. ............. 502/117 |
| 5,527,867 A | 6/1996 | Bergmeister ............... 526/119 |
| 5,543,376 A | 8/1996 | Bergmeister ............... 502/117 |
| 5,624,877 A | 4/1997 | Bergmeister et al. ....... 502/120 |
| 5,648,439 A | 7/1997 | Bergmeister et al. ........ 526/96 |
| 5,866,661 A | 2/1999 | Benham et al. ............. 526/61 |
| 5,922,818 A | 7/1999 | Morterol ...................... 526/88 |
| 6,022,933 A | 2/2000 | Wright et al. ................ 526/68 |
| 6,201,078 B1 | 3/2001 | Breulet et al. ............. 526/113 |
| 6,291,602 B1 | 9/2001 | Koch et al. .................. 526/65 |
| 6,335,411 B1 | 1/2002 | Koch et al. ................. 526/352 |
| 2004/0167015 A1 * | 8/2004 | Cann et al. ................. 502/103 |

FOREIGN PATENT DOCUMENTS

| | | |
|---|---|---|
| BE | 789870 | 4/1973 |
| EP | 0291824 B1 | 4/1994 |
| EP | 0591968 B1 | 7/1997 |
| EP | 0647661 B1 | 3/1998 |
| WO | 92/17511 | 10/1992 |
| WO | 96/21684 | 7/1996 |
| WO | 96/27621 | 9/1996 |
| WO | 97/27225 | 7/1997 |
| WO | 99/45038 | 9/1999 |
| WO | 99/52951 | 10/1999 |
| WO | 99/65949 | 12/1999 |

* cited by examiner

*Primary Examiner*—Roberto Rabago
(74) *Attorney, Agent, or Firm*—Whyte Hirschboeck Dudek SC

(57) ABSTRACT

Polyethylene resins having improved environmental stress crack resistance, stiffness and impact resistance is made by a process comprising feeding both a chromium oxide catalyst and a silyl chromium catalyst into a polymerization reactor. The chromium oxide catalyst and the silyl chromium catalyst are on separate supports. The chromium oxide catalyst is 25–50 weight percent and the silyl chromium catalyst is 50–75 weight percent of the total weight of catalyst. The catalysts may be added separately or as a single mixture.

32 Claims, No Drawings

BLOW MOLDING RESINS WITH IMPROVED ESCR

BACKGROUND OF THE INVENTION

This invention relates generally to ethylene polymerization, and more specifically to methods and apparatus for use of chromium-based catalysts for the production of polyethylene in a gas phase polymerization reactor, and in particular, chromium based catalysts which are chromium oxide based.

Polyethylene resins used in blow molding and extrusion applications require stiffness, impact resistance, and environmental stress crack resistance (ESCR). In processing, these materials need to be able to run at high rates without process instabilities, unacceptable swell, or excessive head pressure or temperature. The majority of polyethylene products used in these applications are produced with chromium catalyst systems in slurry or gas-phase processes. In designing a polyethylene product for these applications, there is a trade-off between properties. ESCR can be increased by decreasing density (crystallinity) and/or increasing molecular weight (or high molecular weight component) and/or preferentially placing short chain branches (SCB) on the higher molecular weight molecules. A decrease in density will increase the ESCR while sacrificing some stiffness. Present chromium oxide catalyst technology can produce products with a balance of properties essentially equal to industry standard products. Silyl chromium (also called "silyl chromate" herein) catalyzed products offer superior physical properties (ESCR, impact) at a given density, however, because of a greater high molecular weight tail, these silyl chromium-produced products exhibit higher swell and higher head pressure in blow molding processing.

BRIEF SUMMARY OF THE INVENTION

In one preferred embodiment, the invention is a process to produce an ethylene polymer. The process comprises the steps of: blending at least one chromium oxide catalyst carried on a first support, the chromium oxide catalyst including compounds calcinable to chromium oxide at conditions used to activate the chromium oxide catalyst, and at least one silyl chromium catalyst carried on a second support to form a catalyst mixture, wherein the chromium oxide catalyst is present in an amount from about 25 to about 50 weight percent based on the total weight of the catalyst mixture and the silyl chromium catalyst is present in an amount of about 50 to about 75 weight percent based on the total weight of the catalyst mixture; introducing the catalyst mixture into a polymerization reactor, wherein at least one monomer comprising ethylene is present in the reactor and the reactor is maintained at polymerization conditions such that the monomer(s) will polymerize in the presence of the catalyst mixture; activating the chromium oxide catalyst either before or after the blending step but prior to introducing the catalyst mixture into the reactor; and, contacting the catalyst mixture and the monomer in the reactor such that an ethylene polymer is formed. The ethylene polymer produced by the process is characterized, in comparison to an ethylene polymer prepared under the same polymerization conditions in the presence of the chromium oxide catalyst only, by an increase in environmental stress crack resistance (ESCR) at least about 400% and an increase in swell of no more than about 15%.

In another preferred embodiment, the invention is a process to produce an ethylene polymer. The process comprises the steps of: providing a polymerization reactor, wherein at least one monomer comprising ethylene is present in the reactor and the reactor is maintained at polymerization conditions; continuously or intermittently introducing at least one activated chromium oxide catalyst carried on a first support into the reactor, the chromium oxide catalyst including compounds calcinable to chromium oxide at conditions used to activate the chromium oxide catalyst; continuously or intermittently introducing at least one silyl chromium catalyst carried on a second support into the reactor such that the chromium oxide catalyst is present in an amount from about 25 to about 50 weight percent and the silyl chromium catalyst is present in an amount of about 50 to about 75 weight percent based on the total weight of the catalysts present in the reactor; and, contacting the chromium oxide catalyst, the silyl chromium catalyst and the monomer(s) in the reactor such that an ethylene polymer is formed. The ethylene polymer formed in the process is characterized, in comparison to an ethylene polymer prepared under the same polymerization conditions in the presence of the chromium oxide catalyst only, by an increase in ESCR of at least about 400% and an increase in swell of no more than about 15%.

DETAILED DESCRIPTION OF THE INVENTION

This invention involves a method to feed chromium-based catalysts to a polymerization reactor, either individually or mixed, in either dry or slurry form, which affords several novel advantages. The chromium-based catalysts are a combination of chromium oxides and silyl chromium catalysts.

The chromium oxide catalysts may be $CrO_3$ or any compound convertible to $CrO_3$ under the activation conditions employed. Compounds convertible to $CrO_3$ are disclosed in U.S. Pat. Nos. 2,825,721; 3,023,203; 3,622, 251; and, 4,011,382 (the disclosures of which patents are incorporated herein by reference) and include chromic acetyl acetone, chromic chloride, chromic nitrate, chromic acetate, chromic sulfate, ammonium chromate, ammonium dichromate or other soluble salts of chromate.

The silyl chromate catalysts are characterized by the presence of at least one group of Formula I:

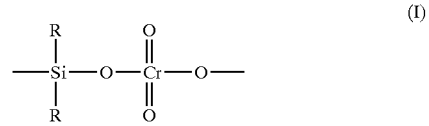

wherein R, each occurrence, is a hydrocarbyl group having from 1 to 14 carbon atoms. Among the preferred compounds having the group of Formula I are the bis-trihydrocarbylsilylchromates of Formula II:

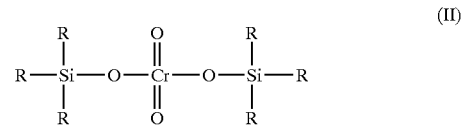

where R is defined as above. R can be any hydrocarbon group such as an alkyl, alkaryl, aralkyl or an aryl radical containing from 1 to about 14 carbon atoms, preferably from about 3 to about 10 carbon atoms. Illustrative thereof are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those which can be employed in this process are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of such catalysts are disclosed, for example, in U.S. Pat. Nos. 3,324,101; 3,704,287; and 4,100,105, the disclosures of which patents are incorporated herein by reference.

The chromium based catalysts of the current invention are deposited onto conventional catalyst supports or bases, e.g., inorganic oxide materials. The inorganic oxide materials which may be used as a support in the catalyst compositions of the present invention are porous materials having a high surface area, e.g., a surface area in the range of about 50 to about 1000 square meters per gram, and a particle size of about 30 to 200 microns. The inorganic oxides which may be used include silica, alumina, thoria, zirconia, aluminum phosphate and other comparable inorganic oxides, as well as mixtures of such oxides. The chromium oxide-based catalysts and silylchromate-based catalysts are each deposited on a separate support. Preferably, the supports for the chromium oxide catalyst and the silylchromate catalysts are similar to each other in terms of surface area and porosity, more preferably the respective catalyst supports have an average pore volume within 30% of each other, most preferably, the respective supports are identical.

Processes for depositing the catalysts on supports are known in the art and may be found in the previously incorporated U.S. patents. The chromium compound is usually deposited on the support from solutions thereof and in such quantities as to provide, after the activation step, the desired levels of chromium in the catalyst. After the compounds are placed on the supports and are activated, there results a powdery, free-flowing particulate material.

Activation of the supported catalyst can be accomplished at nearly any temperature up to about its sintering temperature. The passage of a stream of dry air or oxygen through the supported catalyst during the activation aids in the displacement of the water from the support. Activation temperatures of from about 300° C. to 900° C. for short periods of from about greater than 1 hour to as high as 24–48 hours is sufficient if well dried air or oxygen is used, and the temperature is maintained below the sintering temperature of the support.

This technology can be practiced in several ways. In one preferred method, the chromium oxide and silyl chromate catalysts can be fed separately to a polymerization reactor through two or more catalyst feeders. In another preferred method, the chromium oxide and silyl chromate catalysts can be preblended and fed together as a single mixture to a polymerization reactor through a single catalyst feeder.

In either preferred method, the catalysts can be fed into the reactor via a dry feeder or, more preferably, as a slurry in a viscous inert liquid. The viscous inert liquid of the slurry preferably has a high viscosity of at least 500 cp to inhibit the catalyst from settling out of the slurry. The inert liquid is typically a mineral oil.

The catalyst slurry can be fed into the polymerization reactor using any suitable liquid delivery system. Typically, the slurry will be introduced into the reactor via a high pressure syringe system or other positive displacement device. One typical device is known as a Moyno® Pump; these are generally known as progressive cavity pumps which are highly suitable for moving slurries of high viscosity and generation of high pressures. Such positive displacement provides for accurate and precise delivery rates.

The chromium oxide and silylchromate catalyst system may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may use subatmospheric or superatmospheric pressures and temperatures in the range of about 40° C. to about 115° C. A useful liquid phase polymerization reaction system is described in U.S. Pat. No. 3,324,095 incorporated herein by reference. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is non-reactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 500 psi, most preferably 100 to 450 psi, and temperatures in the range of 30 to 130° C., preferably 65 to 115° C. Stirred or fluidized bed gas phase reaction systems are particularly useful. In the gas fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone which contributes to fluidization of the bed. The start-up of such a polymerization process generally employs a bed of preformed polymer particles similar to the polymer which it is desired to manufacture. During the course of polymerization, fresh polymer is generated by the catalytic polymerization of the monomer, and polymer product is withdrawn to maintain the bed at more or less constant volume. An industrially favored process employs a fluidization grid to distribute the fluidizing gas to the bed, and also to act as a support for the bed when the supply of gas is cut off. A stream containing unreacted monomer is withdrawn from the reactor continuously, compressed, cooled, optionally fully or partially condensed as disclosed in U.S. Pat. Nos. 4,528,790 and 5,462,999, both incorporated herein by reference and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534 incorporated herein by reference. It is expected that the polymerization reactor can be operated with both chromium oxide and silyl chromate catalysts without significant loss in catalyst activity.

Polymerization may be carried out in a single reactor or in two or more reactors in series, and is conducted substantially in the absence of catalyst poisons.

Monomers usefully polymerized according to the present invention include, for example, ethylenically unsaturated monomers, conjugated or nonconjugated dienes, polyenes, etc. Preferred monomers include the $C_2$–$C_8$ α-olefins especially ethylene, propene, isobutylene, 1 butene, 1-hexene, 4-methyl-1-pentene, and 1-octene, and the dienes 5-ethylidene-2-norbornene and piperylene. Other useful monomers include styrene, halo- or alkyl substituted styrenes, tetrafluoroethylene, vinylbenzocyclobutene, 1,4-hexadiene, 1,5-hexadiene, 1,7-octadiene, 4-vinylcyclohexene, and vinylcyclohexane, 2,5-norbornadiene, 1,3-pentadiene, 1,4-pentadiene, 1,3-butadiene, isoprene and naphthenics (e.g., cyclopentene, cyclohexene and cyclooctene).

A polyethylene resin produced with a mixture of the chromium oxide and silyl chromate catalysts will exhibit a desirable balance of improved physical properties and moderate swell. Subsequently, the sample under study is introduced to the blow molder and the weight of the bottle is determined while maintaining the same die gap as that for the control.

EXAMPLES

Catalyst 1

A chromium oxide based catalyst (Catalyst 1) was made as described in EP0640625 A2. As described in EP0640625 A2, such a catalyst may be prepared in the following multi-step procedure:

Step 1: (Drying)—A chromium oxide coated silica (0.5% wt. Cr, calculated as chromium) having about 70% of its pore volume in pore size greater than 100 Angstroms (Davison Grade 955) was introduced into a fluid-bed drying vessel maintained under nitrogen ($N_2$) at ambient temperature and pressure. The temperature of the vessel was increased to 150° C. at a rate of 50° C./hour. The silica was held at 150° C. for 4 hours and cooled to below 100° C. for 2 to 3 hours.

Step 2: (Titanation)—190 Kg of the product of Step 1 was charged to a jacketed mixing vessel. For each Kg of the product of Step 1, 5.4 liters of isopentane were added to the contents of the vessel with stirring and increasing the temperature to 55° C. After the temperature reached 55° C., 0.55 liters of 50 wt. % tetra-isopropyltitanate (TIPT) in hexane were added for each kilogram of the product of Step 1. The vessel is pressurized from atmospheric to 4.1 atmospheres and allowed to mix for 2 hours. The temperature is increased to 100° C. and the pressure is reduced to 1.15 atmospheres allowing the isopentane and hexane solvents to evaporate. Two hours after the pressure is released, the mixture is purged through the bottom of the vessel with 18 Kg/hour of nitrogen for 24 hours.

Step 3. (Activation)—Under good fluidization, the product of Step 2 was heated from ambient temperature to 150° C. at a rate of 50° C./hour under nitrogen. It was then heated at 150° C. for 2 hours followed by increasing the temperature from 150° C. to 325° C. at a rate of 50° C./hour in nitrogen. The product was maintained at 325° C. for 2 hours in nitrogen and then 1 hour in air. The temperature was increased from 325° C. to 825° C. at a rate of 100° C. in air and maintained at 825° C. for 6 hours in air. The temperature was then decreased as fast as possible to 300° C. in air. At 300° C., the air was changed to nitrogen, and the temperature was decreased to ambient temperature as fast as possible.

Catalyst 2

A silyl chromate based catalyst (Catalyst 2) was produced by methods described in U.S. Pat. No. 6,022,933 and U.S. Pat. No. 3,704,287 incorporated herein by reference. Catalyst 2 was the silicon supported reaction product of triphenylsilyl chromate and diethylalumium ethoxide having an aluminum/chromium atomic ratio of 1.5:1. Catalyst 2 can be prepared as follows: a reaction bottle was carefully charged with nitrogen to purge any air therefrom, and 25 milliliters of n-decane were then charged to the bottle. Then, 10 mg. of the silyl chromate ester and 400 mg. of the activated support were charged to the bottle. The n-decane used in these experiments had been previously purified to remove water and other potential catalyst poisons therefrom either by treating it with sulfuric acid or Filtrol clay followed by drying over molecular sieves. After the deposition of the chromate ester on the activated support was complete, as evidenced by the disappearance of color in the solvent, the bottle containing the catalyst system was immersed to an oil bath previously heated to the desired reduction temperature, ±5° C. Where the reduction reaction was to be conducted at room temperature the bottle was not heated at all. After the bottle and contents had reached the desired reaction temperature, 0.5 ml. of a 0.5 M solution of the reducing agent in decane solution was rapidly added with efficient stirring to the supported chromate ester slurry. The resulting reduced catalyst slurry was then cooled, where necessary, to ambient temperatures, and the resulting reduced catalyst was then used in the polymerization reactions as disclosed below. Equivalent results were obtained by preparing a slurry of the supported chromate ester in hexane, removing the hexane under vacuum at ambient temperatures followed by the addition of the dry supported chromate ester to 25 ml. of the decane containing the required amount of the reducing agent at the desired reducing temperature.

Experiments were designed to characterize chromium catalysts in slurry (alone and mixed) both on laboratory and pilot-plant scales.

Blends of PE resins with essentially the same flow index (high load melt index, $I_{21}$) and density produced with the F-3 and S-2 catalyst systems were compounded. Characterization included measurement of physical properties as well as processing in blow molding equipment. The physical properties are summarized in Table 1 and the swell characteristics are shown in FIGS. 1 and 2.

Samples of resin taken from a transition from F-3 to S-2 catalyst on a commercial reactor were characterized. The results of the product evaluations are summarized in Table 2 and FIGS. 3 and 4. For samples 2 and 3, based on an analysis of the catalyst residues, it was estimated that the silyl chromate component concentration of the catalyst mixture was approximately 50–75%. The properties are summarized in Example 1.

The swell of the resin was characterized by a "bottle weight" test. In this test, bottles are molded on an Improved B-15 flow molding machine. The machine is set up with the control resin (standard HIC resin produced with chromium oxide catalyst) producing a 75 gram bottle. Subsequently, the sample under study is introduced to the blow molder and the weight of the bottle is determined while maintaining the same die gap as that for the control.

Example 1

|  | CrO$_3$/ silyl chromate mixed catalyst | control —CrO$_3$ catalyst |
|---|---|---|
| Density | 0.9504 | 0.9512 |
| FI, g/10 min | 11.7 | 11.2 |
| MRF, I$_{21}$/I$_5$ | 21.3 | 27.8 |
| Mw | 203,000 | 189,000 |
| Mw/Mn | 9.0 | 8.2 |
| ESCR, bent strip, condition B 100% Igepal F$_{50}$, hrs | >1500 | 310 |
| Bottle Weight Swell, grams | 79.7 | 68.9 |

Samples of resin taken from a transition from S-2 to F03 catalyst on a pilot plant reactor were characterized. The results of the product analysis are summarized in Table 3 and FIGS. 5 and 6. These samples did exhibit improved ESCR relative to the chromium oxide sample, however, the swell was higher than that observed for the other transition samples studied.

The preferred product design, a higher density of 0.956–0.958, was not produced because samples were not available in this density range. Based on the properties observed at densities in the range of 0.950 to 0.955, the properties summarized in Example 2 are projected.

Example 2

Projected Properties at 0.956–0.958 Density

|  | CrO$_3$/ silyl chromate mixed catalyst | control —CrO$_3$ catalyst typical properties |
|---|---|---|
| density | 0.956–0.958 | 0.955–0.956 |
| FI/ g/10 min | 30 | 24 |
| MFR, I$_{21}$/I$_5$ | 100 | 95 |
| Mw | — | .28 |
| Mw/Mn | — | 9.0 |
| ESCR, bent strip, condition B 100% Igepal F$_{50}$, hrs | 120 | 30 |
| Bottle Weight Swell, grams | 80.0 | 75.0 |

We claim:

1. A process to produce an ethylene polymer, the process comprising the steps of:
    blending at least one chromium oxide catalyst carried on a first support, the chromium oxide catalyst including compounds calcinable to chromium oxide at conditions used to activate the chromium oxide catalyst, and at least one silyl chromium catalyst carried on a second support to form a catalyst mixture, wherein the chromium oxide catalyst is present in an amount from about 25 to about 50 weight percent based on the total weight of the catalyst mixture and the silyl chromium catalyst is present in an amount of about 50 to about 75 weight percent based on the total weight of the catalyst mixture;
    introducing the catalyst mixture into a polymerization reactor, wherein at least one monomer comprising ethylene is present in the reactor and the reactor is maintained at polymerization conditions such that the at least one monomer will polymerize in the presence of the catalyst mixture;
    activating the chromium oxide catalyst either before or after the blending step but prior to introducing the catalyst mixture into the reactor; and,
    contacting the catalyst mixture and the at least one monomer in the reactor such that an ethylene polymer is formed,
    wherein the ethylene polymer is characterized, in comparison to an ethylene polymer prepared under the same polymerization conditions in the presence of the chromium oxide catalyst only, by an increase in environmental stress crack resistance (ESCR) at least about 400% and an increase in swell of no more than about 15%.

2. The process of claim 1 wherein the first support and the second support have an average pore volume within 30% of each other.

3. The process of claim 1 wherein the polymerization reactor is a gas phase reactor.

4. The process of claim 1 wherein the monomer further comprises a C$_3$–C$_{20}$ α-olefin and/or a diene.

5. The process of claim 4 wherein the α-olefin is 1-propene, 1-butene, 1-hexene, 1-octene or a combination thereof.

6. The process of claim 1 wherein the chromium oxide catalyst is at least one of chromic acetyl acetone, chromic chloride, chromic nitrate, chromic acetate, chromic sulfate, ammonium chromate, or ammonium dichromate.

7. The process of claim 1 wherein the silyl chromium catalyst is characterized by the presence of at least one group of Formula I:

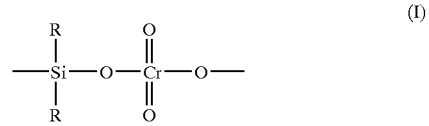

(I)

wherein R, each occurrence, is a hydrocarbyl group having from 1 to 14 carbon atoms.

8. The process of claim 7 wherein silyl chromium catalyst is a bis-trihydrocarbylsilylchromate of Formula II:

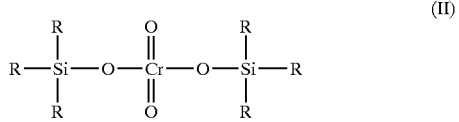

(II)

where R is defined as in claim 7.

9. The process of claim 1 wherein the silyl chromium catalyst is at least one of bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, or polydiethylsilylchromate.

10. The process of claim 1 wherein the monomer further comprises at least one of propene, isobutylene, 1-butene, 1-hexene, 4-methyl-1-pentene, 1-octene, 5-ethylidene-2-norbornene, piperylene, styrene, halo- or alkyl substituted styrenes, tetrafluoroethylene, vinylbenzocyclobutene, 1,4-hexadiene, 1,5-hexadiene, 1,7-octadiene, 4-vinylcyclohexene, vinylcyclohexane, 2,5-norbornadiene, 1,3-pentadiene, 1,4-pentadiene, 1,3-butadiene, isoprene or naphthenics.

11. An ethylene polymer produced by the process of claim 1.

12. A composition comprising the ethylene polymer of claim 11.

13. An article comprising the ethylene polymer of claim 1.

14. The article of claim 13 which is a blow-molded article.

15. The article of claim 14 which is a bottle.

16. The process of claim 1 wherein the catalyst mixture is introduced into the reactor as a slurry in a viscous inert liquid.

17. A process to produce an ethylene polymer, the process comprising the steps of:
providing a polymerization reactor, wherein at least one monomer comprising ethylene is present in the reactor and the reactor is maintained at polymerization conditions;
continuously or intermittently introducing at least one activated chromium oxide catalyst carried on a first support into the reactor, the chromium oxide catalyst including compounds calcinable to chromium oxide at conditions used to activate the chromium oxide catalyst;
continuously or intermittently introducing at least one silyl chromium catalyst carried on a second support into the reactor such that the chromium oxide catalyst is present in an amount from about 25 to about 50 weight percent and the silyl chromium catalyst is present in an amount of about 50 to about 75 weight percent based on the total weight of the catalysts present in the reactor; and,
contacting the chromium oxide catalyst, the silyl chromium catalyst and the monomer(s) in the reactor such that an ethylene polymer is formed;
wherein the ethylene polymer is characterized, in comparison to an ethylene polymer prepared under the same polymerization conditions in the presence of the chromium oxide catalyst only, by an increase in environmental stress crack resistance (ESCR) at least about 400% and an increase in swell of no more than about 15%.

18. The process of claim 17 wherein the first support and the second support have an average pore volume within 30% of each other.

19. The process of claim 17 wherein the polymerization reactor is a gas phase reactor.

20. The process of claim 17 wherein the monomer further comprises a $C_3$–$C_{20}$ α-olefin and/or a diene.

21. The process of claim 20 wherein the α-olefin is 1-propene, 1-butene, 1-hexene, 1-octene or a combination thereof.

22. The process of claim 17 wherein the chromium oxide catalyst is at least one of chromic acetyl acetone, chromic chloride, chromic nitrate, chromic acetate, chromic sulfate, ammonium chromate, or ammonium dichromate.

23. The process of claim 17 wherein the silyl chromium catalyst is characterized by the presence of at least one group of Formula I:

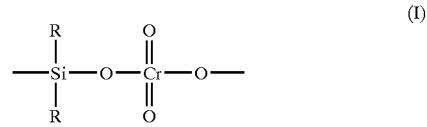

wherein R, each occurrence, is a hydrocarbyl group having from 1 to 14 carbon atoms.

24. The process of claim 23 wherein silyl chromium catalyst is a bis-trihydrocarbylsilylchromate of Formula II:

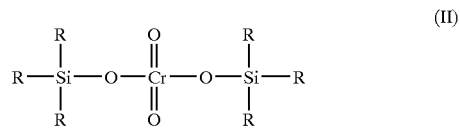

where R is defined as in claim 23.

25. The process of claim 17 wherein the silyl chromium catalsyst is at least one of bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, or polydiethylsilylchromate.

26. The process of claim 17 wherein the monomer further comprises at least one of propene, isobutylene, 1-butene, 1-hexene, 4-methyl-1-pentene, 1-octene, 5-ethylidene-2-norbornene, piperylene, styrene, halo- or alkyl substituted styrenes, tetrafluoroethylene, vinylbenzocyclobutene, 1,4-hexadiene, 1,5-hexadiene, 1,7-octadiene, 4-vinylcyclohexene, vinylcyclohexane, 2,5-norbornadiene, 1,3-pentadiene, 1,4-pentadiene, 1,3-butadiene, isoprene or naphthenics.

27. An ethylene polymer produced by the process of claim 17.

28. A composition comprising the ethylene polymer of claim 27.

29. An article comprising the ethylene polymer of claim 27.

30. The article of claim 29 which is a blow-molded article.

31. The article of claim 30 which is a bottle.

32. The process of claim 17 wherein at least one catalyst is introduced into the reactor as a slurry in a viscous inert liquid.

* * * * *